United States Patent
Meardi et al.

(10) Patent No.: US 12,212,781 B2
(45) Date of Patent: Jan. 28, 2025

(54) ARCHITECTURE FOR SIGNAL ENHANCEMENT CODING

(71) Applicant: V-NOVA INTERNATIONAL LIMITED, London (GB)

(72) Inventors: Guido Meardi, London (GB); Lorenzo Ciccarelli, London (GB); Simone Ferrara, London (GB)

(73) Assignee: V-NOVA INTERNATIONAL LIMITED, London (GB)

(*) Notice: Subject to any disclaimer, the term of this patent is extended or adjusted under 35 U.S.C. 154(b) by 0 days.

(21) Appl. No.: 17/265,146

(22) PCT Filed: Aug. 1, 2019

(86) PCT No.: PCT/GB2019/052151
§ 371 (c)(1),
(2) Date: Feb. 1, 2021

(87) PCT Pub. No.: WO2020/025954
PCT Pub. Date: Feb. 6, 2020

(65) Prior Publication Data
US 2021/0329246 A1 Oct. 21, 2021

(30) Foreign Application Priority Data

Aug. 3, 2018 (GB) .................................. 1812708.4
Aug. 3, 2018 (GB) .................................. 1812709.2
(Continued)

(51) Int. Cl.
*H04N 19/124* (2014.01)
*H04N 19/105* (2014.01)
(Continued)

(52) U.S. Cl.
CPC ........... *H04N 19/61* (2014.11); *H04N 19/105* (2014.11); *H04N 19/122* (2014.11);
(Continued)

(58) Field of Classification Search
CPC ...... H04N 19/124; H04N 19/93; H04N 19/91; H04N 19/60
See application file for complete search history.

(56) References Cited

U.S. PATENT DOCUMENTS 6,937,767 B1 * 8/2005 Burak .................... H04N 19/14
375/E7.184
7,689,051 B2 * 3/2010 Mukerjee ............. H04N 19/105
382/244
(Continued)

FOREIGN PATENT DOCUMENTS

EP 2816805 12/2014
EP 3723373 A1 * 10/2020 ............. H04N 19/11
(Continued)

OTHER PUBLICATIONS

International Search Report and Written Opinion for PCT/GB2019/052151 mailed Nov. 6, 2019.
(Continued)

*Primary Examiner* — Shawn S An
(74) *Attorney, Agent, or Firm* — Workman Nydegger

(57) ABSTRACT

There is disclosed a method of encoding an input signal, the method comprising producing a base encoded signal by feeding an encoder with a down-sampled version of an input signal. The method further comprising producing a first quantised residual signal by: decoding the base encoded signal to produce a base decoded signal; and using a difference between the base decoded signal and the down-sampled version of the input signal to produce a first residual signal; quantising the first residual signal to produce the first
(Continued)

quantised residual signal. The method further comprises producing a second residual signal by: de-quantising the first quantised residual signal to produce a reconstructed version of the first residual signal; correcting the base decoded signal using the first reconstructed version of the residual signal to create a corrected decoded version; upsampling the corrected decoded version; and using a difference between the corrected decoded signal and the input signal to produce the second residual signal.

18 Claims, 6 Drawing Sheets

(30) Foreign Application Priority Data

| | | | |
|---|---|---|---|
| Aug. 3, 2018 | (GB) | .................................. | 1812710.0 |
| Mar. 20, 2019 | (GB) | .................................. | 1903844.7 |
| Mar. 20, 2019 | (GB) | .................................. | 1904492.4 |
| Mar. 23, 2019 | (GB) | .................................. | 1904014.6 |
| Apr. 15, 2019 | (GB) | .................................. | 1905325.5 |

(51) Int. Cl.

| | |
|---|---|
| *H04N 19/122* | (2014.01) |
| *H04N 19/136* | (2014.01) |
| *H04N 19/33* | (2014.01) |
| *H04N 19/36* | (2014.01) |
| *H04N 19/44* | (2014.01) |
| *H04N 19/46* | (2014.01) |
| *H04N 19/60* | (2014.01) |
| *H04N 19/61* | (2014.01) |
| *H04N 19/70* | (2014.01) |
| *H04N 19/91* | (2014.01) |
| *H04N 19/93* | (2014.01) |

(52) U.S. Cl.
CPC ......... *H04N 19/124* (2014.11); *H04N 19/136* (2014.11); *H04N 19/33* (2014.11); *H04N 19/36* (2014.11); *H04N 19/44* (2014.11); *H04N 19/46* (2014.11); *H04N 19/60* (2014.11); *H04N 19/70* (2014.11); *H04N 19/91* (2014.11); *H04N 19/93* (2014.11)

(56) References Cited

U.S. PATENT DOCUMENTS

| | | | |
|---|---|---|---|
| 9,069,713 B2* | 6/2015 | Reznik | H04N 19/51 |
| 2006/0083300 A1* | 4/2006 | Han | H04N 19/152 |
| | | | 375/E7.161 |
| 2006/0083303 A1* | 4/2006 | Han | H04N 19/577 |
| | | | 375/E7.129 |
| 2007/0286508 A1* | 12/2007 | Le Leannec | H04N 19/36 |
| | | | 375/E7.176 |
| 2008/0225952 A1* | 9/2008 | Wang | H04N 19/139 |
| | | | 375/E7.186 |
| 2009/0064254 A1* | 3/2009 | Henocq | H04N 21/234327 |
| | | | 725/116 |
| 2009/0296808 A1* | 12/2009 | Regunathan | H04N 19/46 |
| | | | 375/240.03 |
| 2010/0246395 A1* | 9/2010 | Itaya | H04N 21/6473 |
| | | | 375/240.19 |
| 2013/0314496 A1* | 11/2013 | Rossato | H04N 19/94 |
| | | | 375/240.03 |
| 2014/0355675 A1* | 12/2014 | He | H04N 19/50 |
| | | | 375/240.12 |
| 2017/0257579 A1* | 9/2017 | Said | H04N 19/593 |
| 2018/0302631 A1* | 10/2018 | Chiang | H04N 19/176 |
| 2019/0037227 A1* | 1/2019 | Holland | H04N 19/436 |
| 2019/0312585 A1 | 10/2019 | Handford | |
| 2019/0373264 A1* | 12/2019 | Chong | H04N 19/91 |
| 2020/0128263 A1* | 4/2020 | Mittal | H04N 19/136 |
| 2021/0120252 A1* | 4/2021 | Koo | H04N 19/132 |

FOREIGN PATENT DOCUMENTS

| | | |
|---|---|---|
| GB | 2553557 A | 3/2018 |
| WO | 2010-127692 | 11/2010 |
| WO | 2013-171173 | 11/2013 |

OTHER PUBLICATIONS

Schwarz et al., "Overview of the Scalable Video Coding Extension of the H.264/AVC Standard", IEEE Transaction on Circuits and Systems for Video Technology, vol. 17, No. 9, Sep. 1, 2007, pp. 1103-1120, XP055378169, US ISSN: 1051-8215, DOI: 10.1109/TCSVT.2007.905532, retrieved from the internet on Feb. 1, 2021: URL: https://www.researchgate.net/publication/3309174_Overview_of_the_Scalable_Video_Coding_Extension_of_the_H264AVC_Standard.

EP Office Action Mailed on Apr. 5, 2024 for EP Application No. 19752237, 7 page(s).

* cited by examiner

ARCHITECTURE FOR SIGNAL ENHANCEMENT CODING

The present application is a 371 US Nationalization of International Patent Application No. PCT/GB2019/052151, filed Aug. 1, 2019, which claims priority to UK Patent Application No(s):

1812708.4, filed Aug. 3, 2018;
1812709.2, filed Aug. 3, 2018;
1812710.0, filed Aug. 3, 2018;
1903844.7, filed Mar. 20, 2019;
1904014.6, filed Mar. 23, 2019;
1904492.4, filed Mar. 29, 2019; and
1905325.5, filed Apr. 15, 2019.

The disclosures of which are enclosed herein in their entireties.

TECHNICAL FIELD

This disclosure relates to a method and apparatus for encoding a signal. In particular, but not exclusively, this disclosure relates to a method and apparatus for encoding video and/or image signals, but it can be extended to any other type of data to be compressed and decompressed.

BACKGROUND

There is an urgent need to create flexible solutions to signal encoding and decoding schemes, particularly in the field of video encoding and decoding. Also, it is important to provide the highest quality video output to viewers wherever possible, and to do so in a way that is backward compatible with existing technologies and decoder hardware.

It is an aim of this disclosure to provide a solution to one or more of these needs.

SUMMARY

There is provided a method, computer program, computer-readable medium, and encoder as set out in the appended claims.

BRIEF DESCRIPTION OF THE DRAWINGS

Embodiments of the invention will now be described with reference to the accompanying drawings, in which.

DETAILED DESCRIPTION OF THE EMBODIMENT(S)

This disclosure describes a hybrid backward-compatible coding technology. This technology is a flexible, adaptable, highly efficient and computationally inexpensive coding format which combines a different video coding format, a base codec (i.e. encoder-decoder), (e.g. AVC/H.264, HEVC/H.265, or any other present or future codec, as well as non-standard algorithms such as VP9, AV1 and others) with at least two enhancement levels of coded data.

The general structure of the encoding scheme uses a down-sampled source signal encoded with a base codec, adds a first level of correction or enhancement data to the decoded output of the base codec to generate a corrected picture, and then adds a further level of correction or enhancement data to an up-sampled version of the corrected picture.

Thus, the streams are considered to be a base stream and one or more enhancement streams, where there are typically two enhancement streams. It is worth noting that typically the base stream may be decodable by a hardware decoder while the enhancement stream(s) may be suitable for software processing implementation with suitable power consumption.

This structure creates a plurality of degrees of freedom that allow great flexibility and adaptability in many situations, thus making the coding format suitable for many use cases including OTT transmission, live streaming, live UHD broadcast, and so on. It also provides for low complexity video coding.

Although the decoded output of the base codec is not intended for viewing, it is a fully decoded video at a lower resolution, making the output compatible with existing decoders and, where considered suitable, also usable as a lower resolution output.

The codec format uses a minimum number of relatively simple coding tools. When combined synergistically, they can provide visual quality improvements when compared with a full resolution picture encoded with the base codec whilst at the same time generating flexibility in the way they can be used.

The methods and apparatuses are based on an overall algorithm which is built over an existing encoding and/or decoding algorithm (e.g. MPEG standards such as AVC/H.264, HEVC/H.265, etc. as well as non-standard algorithms such as VP9, AV1, and others) which works as a baseline for an enhancement layer. The enhancement layer works accordingly to a different encoding and/or decoding algorithm. The idea behind the overall algorithm is to encode/decode hierarchically the video frame as opposed to using block-based approaches as done in the MPEG family of algorithms. Hierarchically encoding a frame includes generating residuals for the full frame, and then a reduced or decimated frame and so on.

Figure 1:
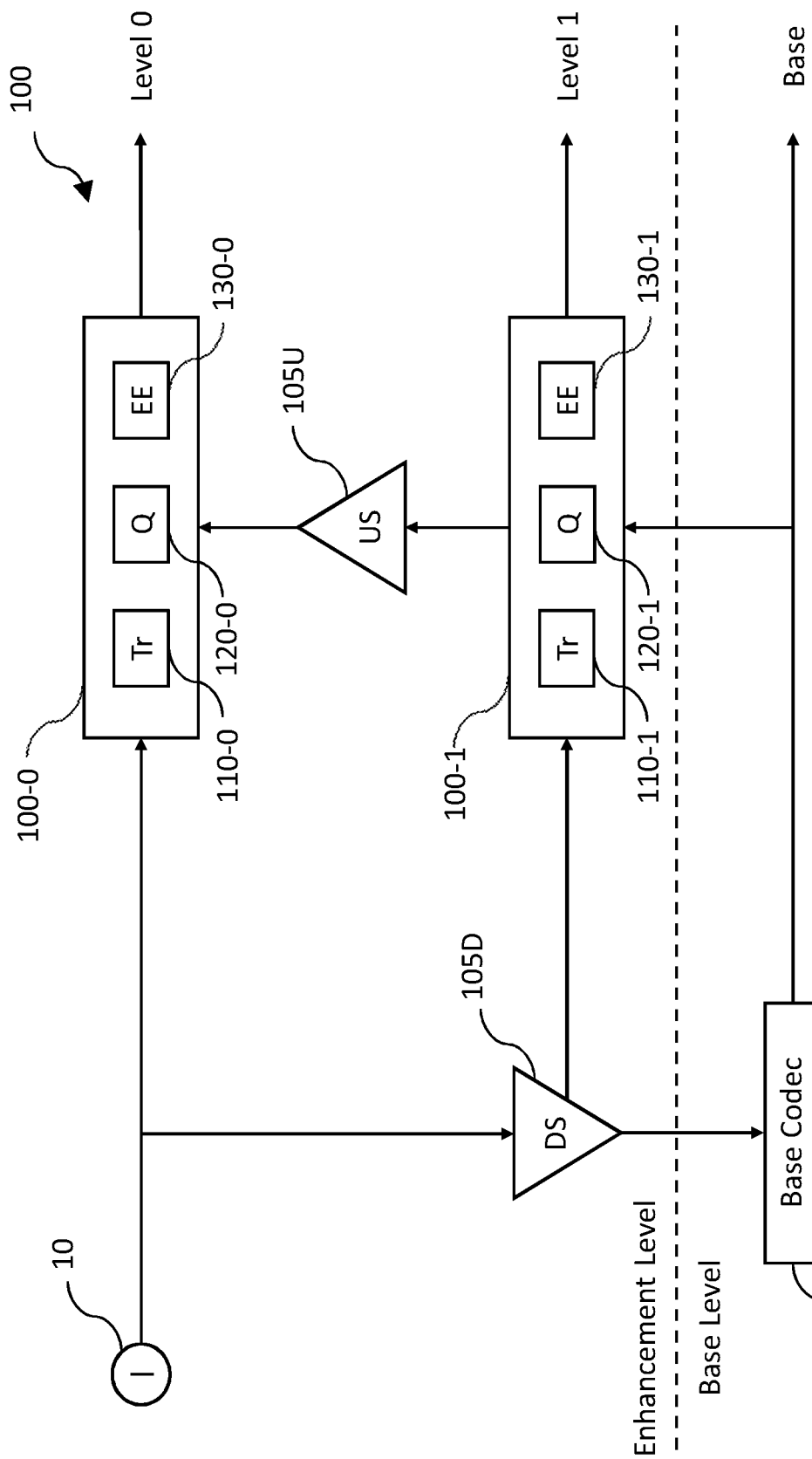
FIG. 1 is a block diagram illustrating an encoding process.

An encoding process is depicted in the block diagram of FIG. 1. The encoding process is split into two halves as shown by the dashed line. Below the dashed line is the base level of an encoder 100, which may usefully be implemented in hardware. Above the dashed line is the enhancement level, which may usefully be implemented in software. The encoder 100 may comprise only the enhancement level processes, or a combination of the base level processes and enhancement level processes as needed. The encoder 100 may usefully be implemented in software, especially at the enhancement level. This arrangement allows, for example, a legacy hardware encoder that provides the base level to be upgraded using a firmware (e.g. software) update, where the firmware is configured to provide the enhancement level. In newer devices, both the base level and the enhancement level may be provided in hardware and/or a combination of hardware and software.

The encoder topology at a general level is as follows. The encoder 100 comprises an input I for receiving an input signal 10. The input I is connected to a down-sampler 105D and processing block 100-0. The down-sampler 105D outputs to a base codec 120 at the base level of the encoder 100. The down-sampler 105D also outputs to processing block 100-1. Processing block 100-1 passes an output to an up-sampler 105U, which in turn outputs to the processing block 100-0. Each of the processing blocks 100-0 and 100-1 comprise one or more of the following modules: a transform block 110, a quantisation block 120 and an entropy encoding block 130.

The input signal 10, such as in this example a full (or highest) resolution video, is processed by the encoder 100 to generate various encoded streams. A first encoded stream (an encoded base stream) is produced by feeding the base codec 120 (e.g., AVC, HEVC, or any other codec) at the base level with a down-sampled version of the input video 10, using the down-sampler 105D. A second encoded stream (an encoded level 1 stream) is created by reconstructing the encoded base stream to create a base reconstruction, and then taking the difference between the base reconstruction and the down-sampled version of the input video 10. This difference signal is then processed at block 100-1 to create the encoded level 1 stream. Block 100-1 comprises a transform block 110-1, a quantisation block 120-1 and an entropy encoding block 130-1. A third encoded stream (an encoded level 0 stream) is created by up-sampling a corrected version of the base reconstruction, using the up-sampler 105U, and taking the difference between the corrected version of the base reconstruction and the input signal 10. This difference signal is then processed at block 100-0 to create the encoded level 0 stream. Block 100-0 comprises a transform block 110-0, a quantisation block 120-0 and an entropy encoding block 130-0.

The encoded base stream may be referred to as the base layer or base level.

Figure 2:
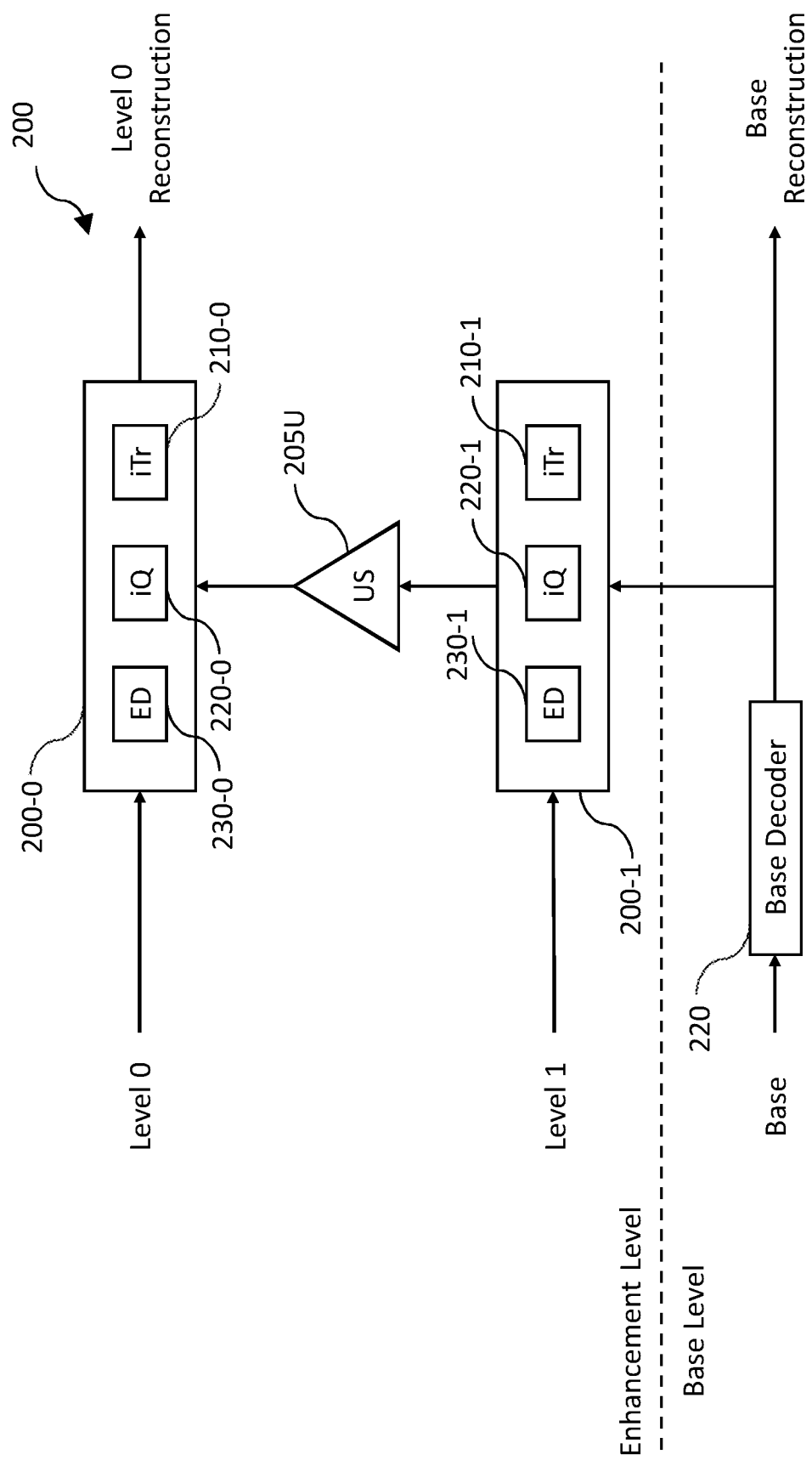
FIG. 2 is a block diagram illustrating a decoding process which corresponds to the encoding process of FIG. 1.

A corresponding decoding process is depicted in the block diagram of FIG. 2. The decoding process is split into two halves as shown by the dashed line. Below the dashed line is the base level of a decoder 200, which may usefully be implemented in hardware. Above the dashed line is the enhancement level, which may usefully be implemented in software. The decoder 200 may comprise only the enhancement level processes, or a combination of the base level processes and enhancement level processes as needed. The decoder 200 may usefully be implemented in software, especially at the enhancement level, and may suitably sit over legacy decoding technology, particularly legacy hardware technology. By legacy technology, it is meant older technology previously developed and sold which is already in the marketplace, and which would be inconvenient and/or expensive to replace, and which may still serve a purpose for decoding signals.

The decoder topology at a general level is as follows. The decoder 200 comprises an input (not shown) for receiving one or more input signals comprising the encoded base stream, the encoded level 1 stream, and the encoded level 0 stream together with optional headers containing further decoding information. The decoder 200 comprises a base decoder 220 at the base level, and processing blocks 200-1 and 200-0 at the enhancement level. An up-sampler 205U is also provided between the processing blocks 200-1 and 200-0 to provide processing block 200-0 with an up-sampled version of a signal output by processing block 200-1.

The decoder 200 receives the one or more input signals and directs the three streams generated by the encoder 100. The encoded base stream is directed to and decoded by the base decoder 220, which corresponds to the base codec 120 used in the encoder 100, and which acts to reverse the encoding process at the base level. The encoded level 1 stream is processed by block 200-1 of decoder 200 to recreate the first residuals created by encoder 100. Block 200-1 corresponds to the processing block 100-1 in encoder 100, and at a basic level acts to reverse or substantially reverse the processing of block 100-1. The output of the base decoder 220 is combined with the first residuals obtained from the encoded level 1 stream. The combined signal is up-sampled by up-sampler 205U. The encoded level 0 stream is processed by block 200-0 to recreate the further residuals created by the encoder 100. Block 200-0 corresponds to the processing block 100-0 of the encoder 100, and at a basic level acts to reverse or substantially reverse the processing of block 100-0. The up-sampled signal from up-sampler 205U is combined with the further residuals obtained from the encoded level 0 stream to create a level 0 reconstruction of the input signal 10.

As noted above, the enhancement stream may comprise two streams, namely the encoded level 1 stream (a first level of enhancement) and the encoded level 0 stream (a second level of enhancement). The encoded level 1 stream provides a set of correction data which can be combined with a decoded version of the base stream to generate a corrected picture.

Figure 3:
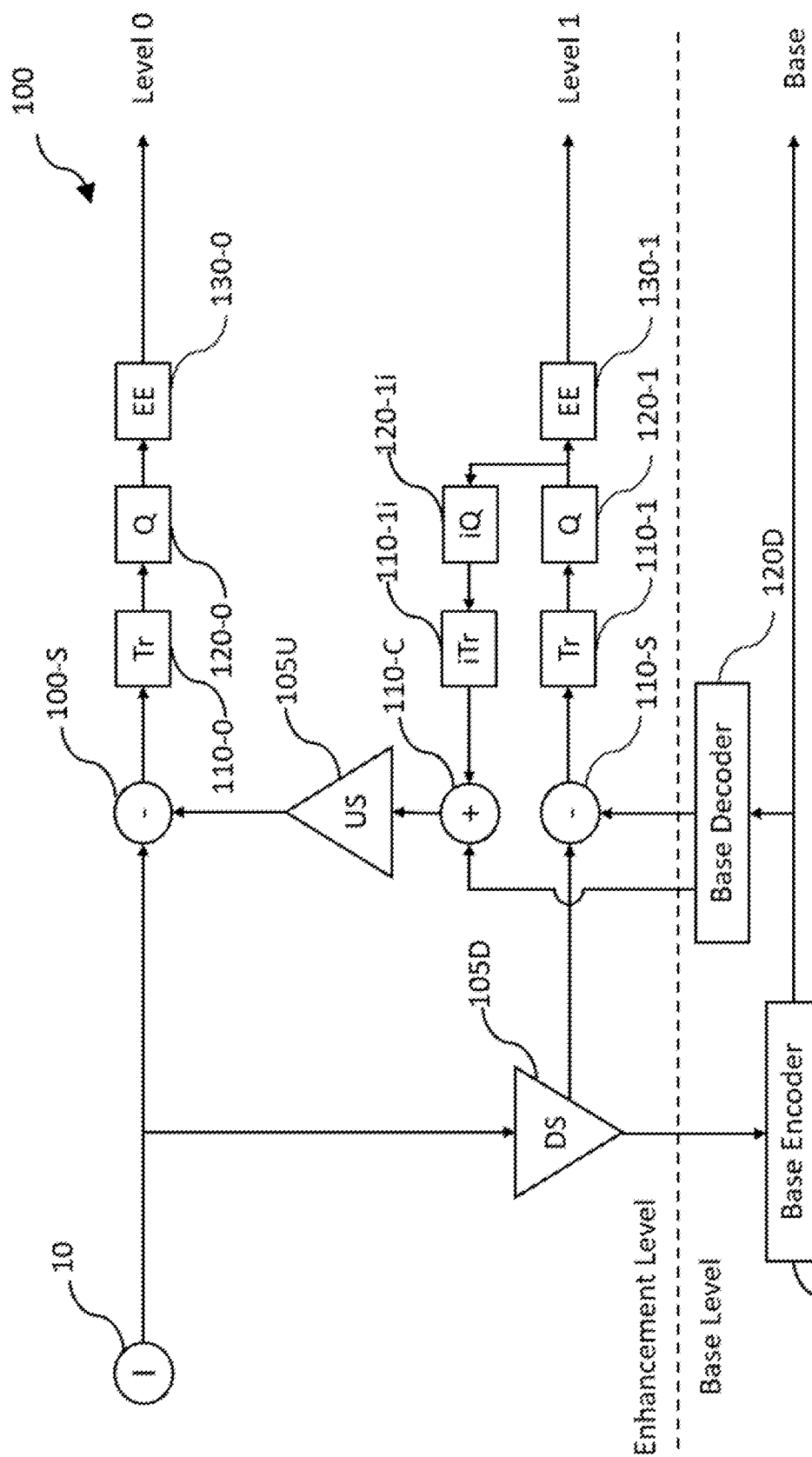
FIG. 3 is a block diagram illustrating the encoding process of FIG. 1 in more detail.

FIG. 3 shows the encoder 100 of FIG. 1 in more detail. The encoded base stream is created directly by the base encoder 120E, and may be quantised and entropy encoded as necessary. In certain cases, these latter processes may be performed as part of the encoding by the base encoder 120E. To generate the encoded level 1 stream, the encoded base stream is decoded at the encoder 100 (i.e. a decoding operation is applied at base decoding block 120D to the encoded base stream). The base decoding block 120D is shown as part of the base level of the encoder 100 and is shown separate from the corresponding base encoding block 120E. For example, the base decoder 120D may be a decoding component that complements an encoding component in the form of the base encoder 120E with a base codec. In other examples, the base decoding block 120D may instead be part of the enhancement level and in particular may be part of processing block 100-1.

Returning to FIG. 3, a difference between the decoded base stream output from the base decoding block 120D and the down-sampled input video is created (i.e. a subtraction operation 110-S is applied to the down-sampled input video and the decoded base stream to generate a first set of residuals). Here the term residuals is used in the same manner as that known in the art; that is, residuals represent the error or differences between a reference signal or frame and a desired signal or frame. Here the reference signal or frame is the decoded base stream and the desired signal or frame is the down-sampled input video. Thus the residuals used in the first enhancement level can be considered as a correction signal as they are able to 'correct' a future decoded base stream to be the or a closer approximation of the down-sampled input video that was used in the base encoding operation. This is useful as this can correct for quirks or other peculiarities of the base codec. These include, amongst others, motion compensation algorithms applied by the base codec, quantisation and entropy encoding applied by the base codec, and block adjustments applied by the base codec.

The first set of residuals are processed at block 100-1 in FIG. 1. The components of this block are shown in more detail in FIG. 3. In particular, the first set of residuals are transformed, quantized and entropy encoded to produce the encoded level 1 stream. In FIG. 3, a transform operation 110-1 is applied to the first set of residuals; a quantization operation 120-1 is applied to the transformed set of residuals to generate a set of quantized residuals; and, an entropy encoding operation 130-1 is applied to the quantized set of residuals to generate the encoded level 1 stream at the first level of enhancement. However, it should be noted that in other examples only the quantisation step 120-1 may be performed, or only the transform step 110-1. Entropy encoding may not be used, or may optionally be used in addition to one or both of the transform step 110-1 and quantisation step 120-1. The entropy encoding operation can be any suitable type of entropy encoding, such as a Huffmann encoding operation or a run-length encoding (RLE) operation, or a combination of both a Huffmann encoding operation and a RLE operation.

As noted above, the enhancement stream may comprise the encoded level 1 stream (the first level of enhancement) and the encoded level 0 stream (the second level of enhancement). The first level of enhancement may be considered to enable a corrected video at a base level, that is, for example to correct for encoder quirks. The second level of enhancement may be considered to be a further level of enhancement that is usable to convert the corrected video to the original input video or a close approximation thereto. For example, the second level of enhancement may add fine detail that is lost during the downsampling and/or help correct from errors that are introduced by one or more of the transform operation 110-1 and the quantization operation 120-1.

Referring to both FIG. 1 and FIG. 3, to generate the encoded level 0 stream, a further level of enhancement information is created by producing and encoding a further set of residuals at block 100-0. The further set of residuals are the difference between an up-sampled version (via up-sampler 105U) of a corrected version of the decoded base stream (the reference signal or frame), and the input signal 10 (the desired signal or frame).

To achieve a reconstruction of the corrected version of the decoded base stream as would be generated at the decoder 200, at least some of the processing steps of block 100-1 are reversed to mimic the processes of the decoder 200, and to account for at least some losses and quirks of the transform and quantisation processes. To this end, block 100-1 comprises an inverse quantise block 120-1i and an inverse transform block 110-1i. The quantized first set of residuals are inversely quantized at inverse quantise block 120-1i and are inversely transformed at inverse transform block 110-1i in the encoder 100 to regenerate a decoder-side version of the first set of residuals.

The decoded base stream from decoder 120D is combined with the decoder-side version of the first set of residuals (i.e. a summing operation 110-C is performed on the decoded base stream and the decoder-side version of the first set of residuals). Summing operation 110-C generates a reconstruction of the down-sampled version of the input video as would be generated in all likelihood at the decoder—i.e. a reconstructed base codec video). As illustrated in FIG. 1 and FIG. 3, the reconstructed base codec video is then up-sampled by up-sampler 105U.

The up-sampled signal (i.e. reference signal or frame) is then compared to the input signal 10 (i.e. desired signal or frame) to create a further set of residuals (i.e. a difference operation 100-S is applied to the up-sampled re-created stream to generate a further set of residuals). The further set of residuals are then processed at block 100-0 to become the encoded level 0 stream (i.e. an encoding operation is then applied to the further set of residuals to generate the encoded further enhancement stream).

In particular, the further set of residuals are transformed (i.e. a transform operation 110-0 is performed on the further set of residuals to generate a further transformed set of residuals). The transformed residuals are then quantized and entropy encoded in the manner described above in relation to the first set of residuals (i.e. a quantization operation 120-0 is applied to the transformed set of residuals to generate a further set of quantized residuals; and, an entropy encoding operation 120-0 is applied to the quantized further set of residuals to generate the encoded level 0 stream containing the further level of enhancement information). However, only the quantisation step 120-1 may be performed, or only the transform and quantization step. Entropy encoding may optionally be used in addition. Preferably, the entropy encoding operation may be a Huffmann encoding operation or a run-length encoding (RLE) operation, or both.

Thus, as illustrated in FIGS. 1 and 3 and described above, the output of the encoding process is a base stream at a base level, and one or more enhancement streams at an enhancement level which preferably comprises a first level of enhancement and a further level of enhancement.

Figure 4:
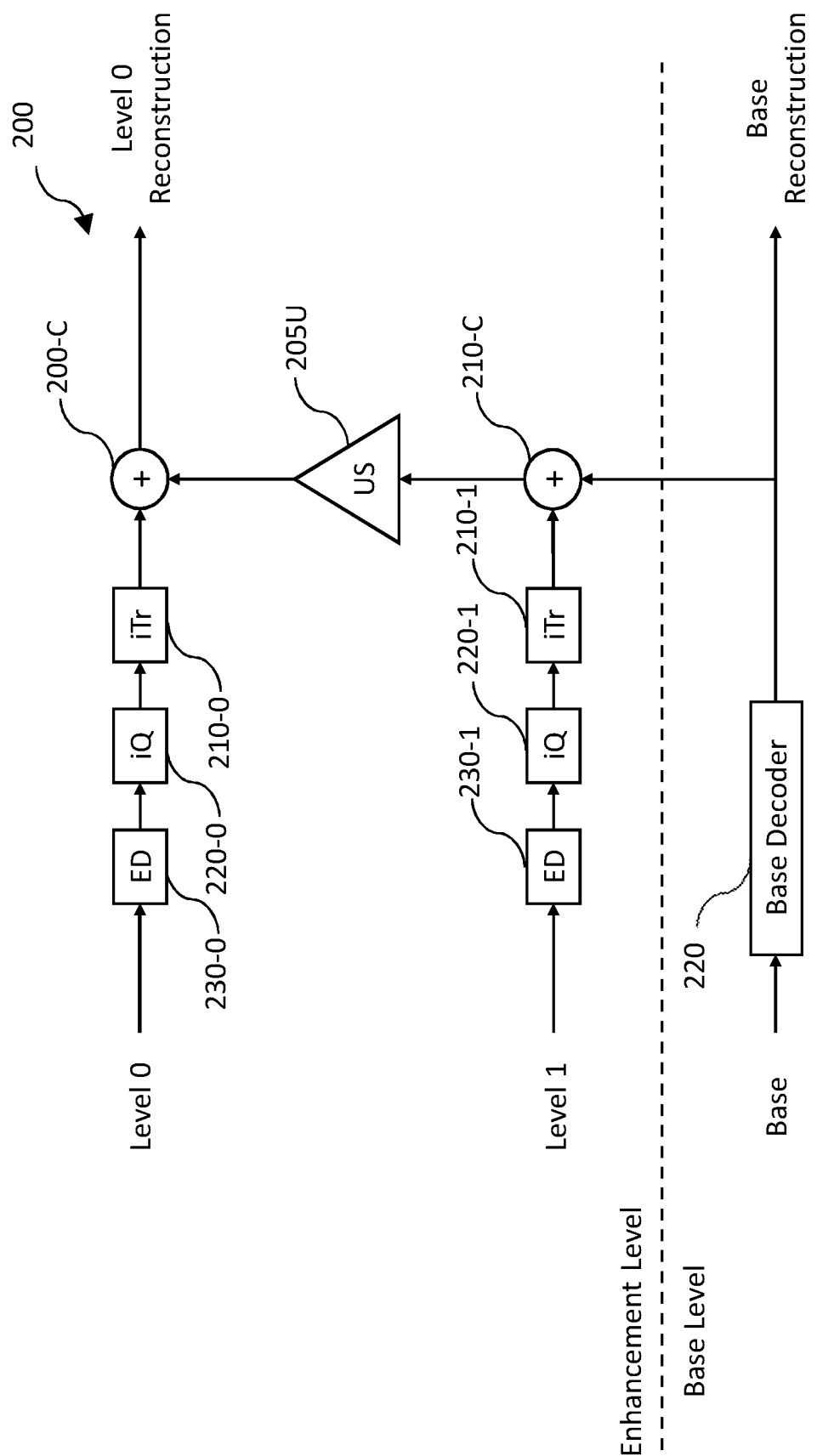
FIG. 4 is a block diagram illustrating the decoding process of FIG. 2 in more detail.

The encoded base stream and one or more enhancement streams are received at the decoder 200. FIG. 4 shows the decoder of FIG. 2 in more detail.

The encoded base stream is decoded at base decoder 220 in order to produce a base reconstruction of the input signal 10 received at encoder 100. This base reconstruction may be used in practice to provide a viewable rendition of the signal 10 at the lower quality level. However, the primary purpose of this base reconstruction signal is to provide a base for a higher quality rendition of the input signal 10. To this end, the decoded base stream is provided to processing block 200-1. Processing block 200-1 also receives encoded level 1 stream and reverses any encoding, quantisation and transforming that has been applied by the encoder 100. Block 200-1 comprises an entropy decoding process 230-1, an inverse quantization process 220-1, and an inverse transform process 210-1. Optionally, only one or more of these steps may be performed depending on the operations carried out at corresponding block 100-1 at the encoder. By performing these corresponding steps, a decoded level 1 stream comprising the first set of residuals is made available at the decoder 200. The first set of residuals is combined with the decoded base stream from base decoder 220 (i.e. a summing operation 210-C is performed on a decoded base stream and the decoded first set of residuals to generate a reconstruction of the down-sampled version of the input video—i.e. the reconstructed base codec video). As illustrated in FIG. 2 and FIG. 4, the reconstructed base codec video is then up-sampled by up-sampler 205U.

Additionally, and optionally in parallel, the encoded level 0 stream is processed at block 200-0 of FIG. 2 in order to produce a decoded further set of residuals. Similarly to processing block 100-0, processing block 200-0 comprises an entropy decoding process 230-0, an inverse quantization process 220-0 and an inverse transform process 210-0. Of course, these operations will correspond to those performed at block 100-0 in encoder 100, and one or more of these steps may be omitted as necessary. Block 200-0 produces a decoded level 0 stream comprising the further set of residuals and these are summed at operation 200-C with the output from the up-sampler 205U in order to create a level 0 reconstruction of the input signal 10.

Thus, as illustrated in FIGS. 1 to 4 and described above, the output of the decoding process is a base reconstruction, and an original signal reconstruction at a higher level. This embodiment is particularly well-suited to creating encoded and decoded video at different frame resolutions. For example, the input signal 10 may be an HD video signal comprising frames at 1920×1080 resolution. In certain cases, the base reconstruction and the level 0 reconstruction may both be used by a display device. For example, in cases of network traffic, the level 0 stream may be disrupted more than the level 1 and base streams (as it may contain up to 4× the amount of data where downsampling reduces the dimensionality in each direction by 2). In this case, when traffic occurs the display device may revert to displaying the base reconstruction while the level 0 stream is disrupted (e.g. while a level 0 reconstruction is unavailable), and then return to displaying the level 0 reconstruction when network conditions improve. A similar approach may be applied when a decoding device suffers from resource constraints, e.g. a set-top box performing a systems update may have an operation base decoder 220 to output the base reconstruction but may not have processing capacity to compute the level 0 reconstruction.

The encoding arrangement of FIGS. 1 and 3 also enables video distributors to distribute video to a set of heterogeneous devices; those with just a base decoder 220 view the base reconstruction, whereas those with the enhancement level may view a higher-quality level 0 reconstruction. In comparative cases, two full video streams at separate resolutions were required to service both sets of devices. As the level 0 and level 1 enhancement streams encode residual data, the level 0 and level 1 enhancement streams may be more efficiently encoded, e.g. distributions of residual data typically have much of their mass around 0 (i.e. where there is no difference) and typically take on a small range of values about 0. This may be particularly the case following quantisation. In contrast, full video streams at different resolutions will have different distributions with a non-zero mean or median that require a higher bit rate for transmission to the decoder.

Description of Tools

It was noted above how a set of tools may be applied to each of the enhancement streams (or the input video) throughout the process. The following provides a summary each of the tools and their functionality within the overall process as illustrated in FIGS. 1 to 4.

Down-Sampling

The down-sampling process is applied to the input video to produce a down-sampled video to be encoded by a base codec. Typically, down-sampling reduces a picture resolution. The down-sampling can be done either in both vertical and horizontal directions, or alternatively only in the horizontal direction. Any suitable down-sampling process may be used.

Level 1 (L-1) Encoding

The input to this tool comprises the L-1 residuals obtained by taking the difference between the decoded output of the base codec and the down-sampled video. The L-1 residuals are then transformed, quantized and encoded.

Transform

The transform tool uses a directional decomposition transform such as a Hadamard-based transform.

There are two types of transforms that are particularly useful in the process. Both have a small kernel (i.e. 2×2 or 4×4) which is applied directly to the residuals. More details on the transform can be found for example in patent applications PCT/EP2013/059847 or PCT/GB2017/052632, which are incorporated herein by reference. In a further example, the encoder may select between different transforms to be used, for example between the 2×2 kernel and the 4×4 kernel. This enables further flexibility in the way the residuals are encoded. The selection may be based on an analysis of the data to be transformed.

The transform may transform the residual information to four planes. For example, the transform may produce the following components: average, vertical, horizontal and diagonal.

Quantization

Any known quantization scheme may be useful to create the residual signals into quanta, so that certain variables can assume only certain discrete magnitudes. In one case quantising comprises actioning a division by a pre-determined step-width. This may be applied at both levels (0 and 1). For example, quantising at block 120-1 may comprise dividing transformed residual values by a step-width. The step-width may be pre-determined, e.g. selected based on a desired level of quantisation. In one case, division by a step-width may be converted to a multiplication by an inverse step-width, which may be more efficiently implemented in hardware. In this case, de-quantising, such as at block 120-1$i$, may comprise multiplying by the step-width.

Entropy Coding

The quantized coefficients are encoded using an entropy coder. In a scheme of entropy coding, the quantized coefficients are first encoded using run length encoding (RLE), then the encoded output is processed using a Huffman encoder.

However, only one of these schemes may be used when entropy encoding is desirable.

Level 1 (L-1) Decoding

The input to this tool comprises the L-1 encoded residuals, which are passed through an entropy decoder, a de-quantizer and an inverse transform module. The operations performed by these modules are the inverse operations performed by the modules described above.

Up-Sampling

The combination of the decoded L-1 residuals and base decoded video is up-sampled in order to generate an up-sampled reconstructed video.

Level 0 (L-0) Encoding

The input to this tool comprises the L-0 residuals obtained by taking the difference between the up-sampled reconstructed video and the input video. The L-0 residuals are then transformed, quantized and encoded as further described below. The transform, quantization and encoding are performed in the same manner as described in relation to L-1 encoding.

Level 0 (L-0) Decoding

The input to this tool comprises the encoded L-0 residuals. The decoding process of the L-0 residuals are passed through an entropy decoder, a de-quantizer and an inverse transform module. The operations performed by these modules are the inverse operations performed by the modules described above.

Residuals Data Structure

In the encoding/decoding algorithm described above, there are typically 3 planes of data (e.g., YUV or RGB for image or video data), with two level of qualities (LoQs) which are described as level 0 (or LoQ-0 or top level, full resolution) and level 1 (LoQ-1 or lower level, reduced-size resolution, such as half resolution) in every plane.

Description of Basic Encoding Process

Figure 5:
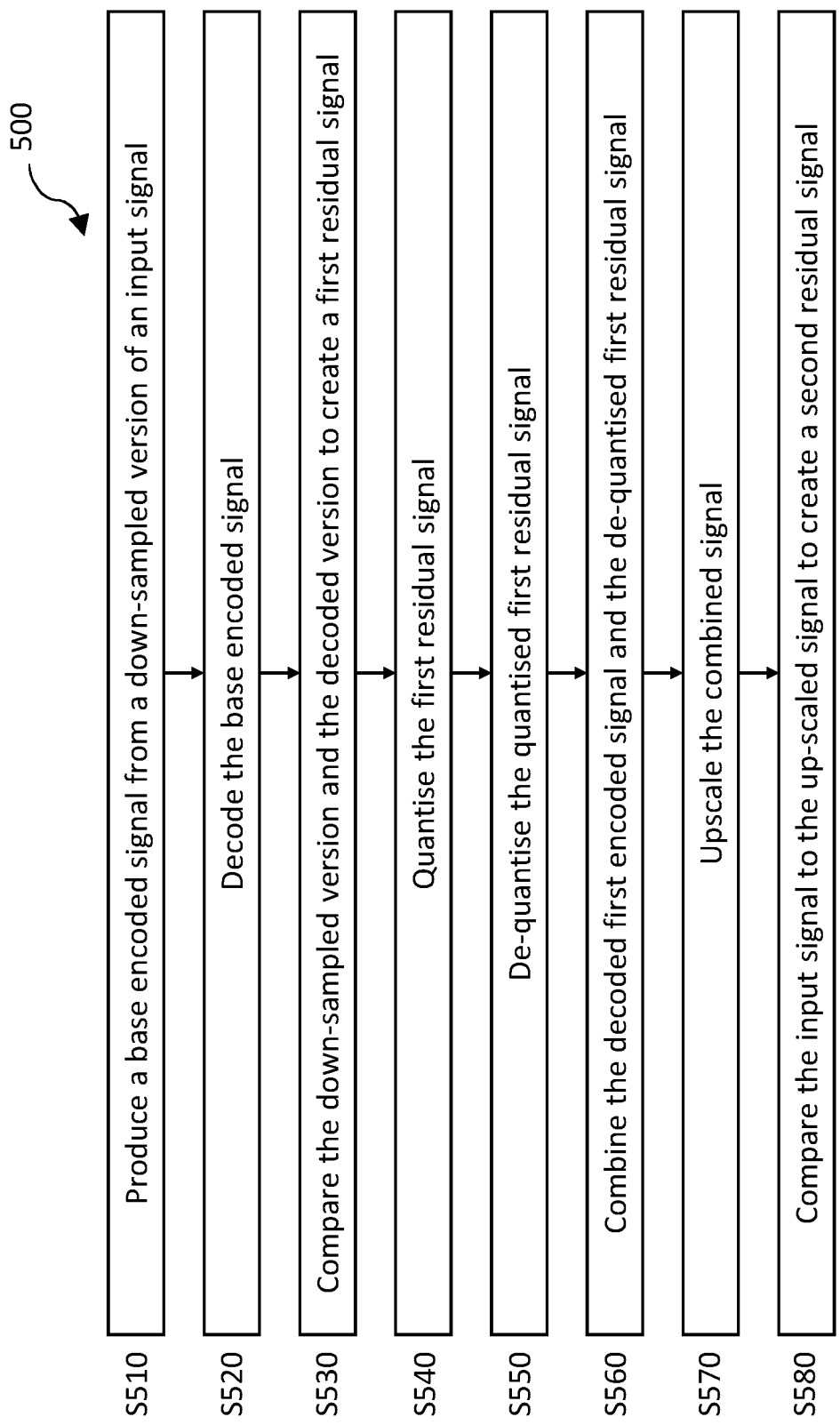
FIG. 5 is a flow chart illustrating an encoding method.

FIG. 5 is a flow chart illustrating a basic encoding method. The method is as follows:

Step 510: produce a base encoded signal from a down-sampled version of an input signal.

Step 520: decode the base encoded signal.

Step 530: compare the down-sampled version and the decoded version to create the first residual signal.

Step 540: quantize the first residual signal.

Step 550: de-quantize the quantized first residual signal.

Step 560: combine the decoded first encoded signal and the de-quantized first residual signal.

Step 570: upscale the combined signal.

Step 580: compare the input signal to the up-scaled signal to create a second residual signal.

Of course, the method may comprise features compatible with the description of FIGS. 1 to 4. In particular, the method may comprise also transforming and inverse transforming the first residual signal.

Figure 6:
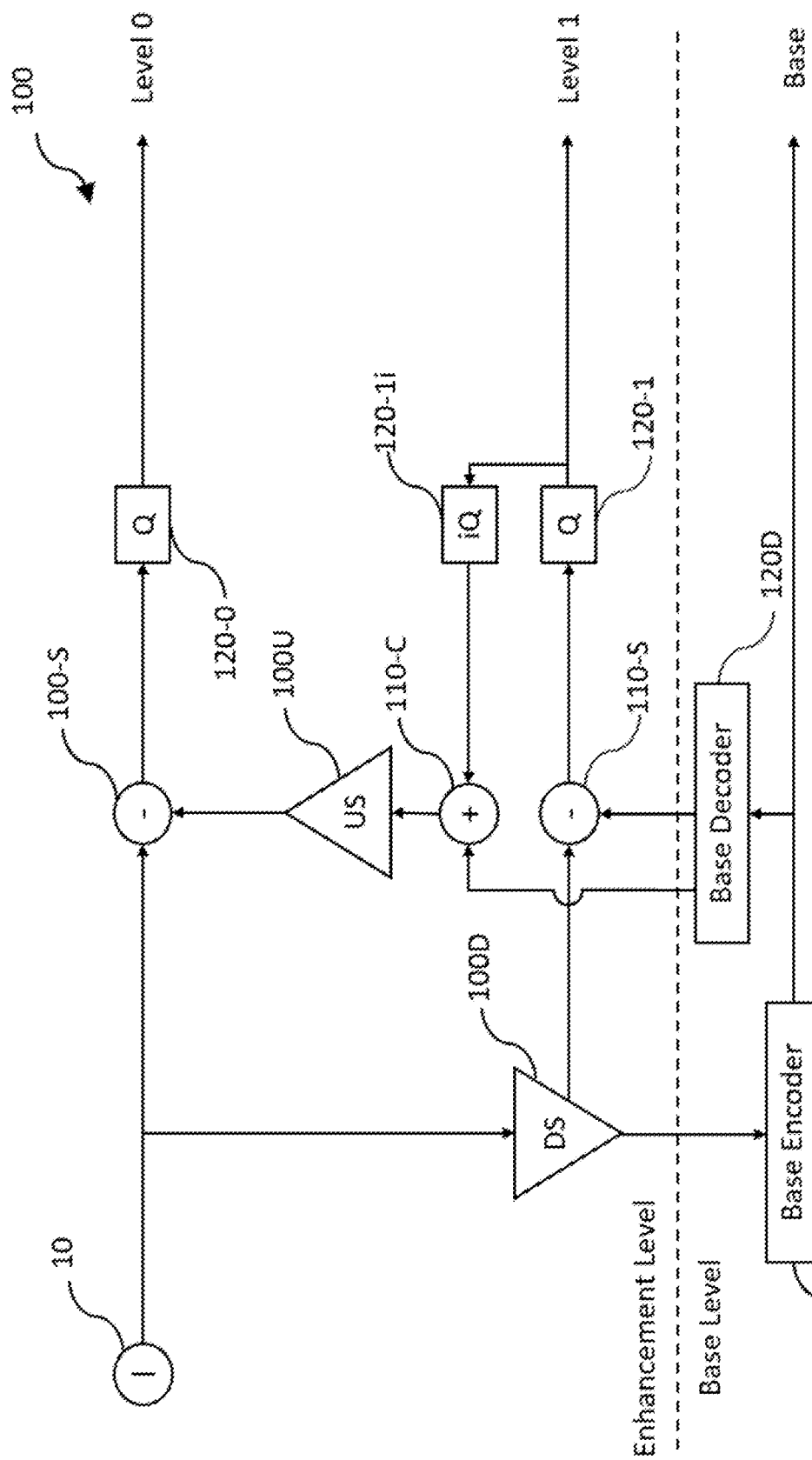
FIG. 6 is a block diagram shoring a modified version of the encoder of FIG. 3.

FIG. 6 is a block diagram shoring a modified version of the encoder of FIG. 3.

As can be seen, the transform block 110-1 and entropy encoding block 130-1 are removed, so that only a quantization step 120-1 and an inverse quantization step 120-1$i$ are performed at the encoder 100. Equally, only a transform and inverse transform may be applied. The reason for applying one or both of the inverse quantisation step and inverse transform step at the encoder 100 is to account for artefacts, noise, or other defects introduced into the level 1 residual signal information in the level 0 residuals. Of course, it is desirable to have the entropy encoding block 130-1 in order to reduce the bit rate of the encoded level 1 stream. As can be seen from FIG. 6, the encoded level 0 stream containing the further set of residuals is similarly only quantized by quantise block 120-0. It is also possible to transmit the further set of residuals without any encoding whatsoever, or to perform only the transform process 110-0.

As can be seen in FIG. 3 and FIG. 6, the base codec 120 can be separated into 2 components, that is a base encoder 120E and a base decoder 120D. It should be noted that the encoding and decoding parts can be in a single codec module, either in hardware or in software, or they can be separate modules or components. The base decoder 120D may reside at the enhancement level in the encoder 100 if required.

In the examples described herein, residuals may be considered to be errors or differences at a particular level of quality or resolution. In described examples, there are two levels of quality or resolutions and thus two sets of residuals (level 1 and level 0). Each set of residuals described herein models a different form of error or difference. The level 1 residuals, for example, typically correct for the characteristics of the base encoder, e.g. correct artifacts that are introduced by the base encoder as part of the encoding process. In contrast, the level 0 residuals, for example, typically correct complex effects introduced by the shifting in the levels of quality and differences introduced by the level 1 correction (e.g. artifacts generated over a wider spatial scale, such as areas of 4 or 16 pixels, by the level 1 encoding pipeline). This means it is not obvious that operations performed on one set of residuals will necessarily provide the same effect for another set of residuals, e.g. each set of residuals may have different statistical patterns and sets of correlations.

The invention claimed is:

1. A method of encoding an input signal, the method comprising:
producing a base encoded signal by feeding an encoder with a down-sampled version of an input signal;
producing a first quantised residual signal by:
decoding the base encoded signal to produce a base decoded signal;
using a difference between the base decoded signal and the down-sampled version of the input signal to produce a first residual signal, wherein the first residual signal is subjected to a transform that involves the encoder selecting between use of a N×N kernel and a M×M kernel for application against the first residual signal, such that the encoder, as a part of said selection, considers both the N×N kernel and the M×M kernel, and wherein distributions of both the first residual signal and a second residual signal have mass ranges that are within a threshold around 0, such that level 0 and level 1 enhancement streams have their masses at about a value of 0; and
quantising the first residual signal to produce the first quantised residual signal, wherein said quantising includes converting a division operation that involves a selected step-width into a multiplication operation that involves an inverse of the step-width and then applying the multiplication operation to the first residual signal;
producing the second residual signal by:
de-quantising the first quantised residual signal to produce a reconstructed version of the first residual signal;
correcting the base decoded signal using the first reconstructed version of the residual signal to create a corrected decoded version;
upsampling the corrected decoded version; and
using a difference between the corrected decoded signal and the input signal to produce the second residual signal,
wherein the input signal when encoded comprises the base encoded signal, the first quantised signal and the second residual signal.

2. The method of claim 1, wherein the step of producing a first quantised residual signal comprises performing said transform to the first residual signal prior to quantising to produce a first transformed and quantised residual signal, and the step of producing a second residual signal comprises inverse transforming the first transformed and quantised signal after de-quantising the first transformed and quantised residual signal.

3. The method of claim 2, wherein said transform is a directional decomposition transform that is applied to the first residual signal to create components that correspond to the first residual signal.

4. The method of claim 3, where the directional decomposition transform comprises the M×M kernel, which is a 4×4 kernel.

5. The method of claim 3, wherein the directional decomposition transform is a Hadamard-based transform.

6. The method of claim 3, wherein the transform produces the following components: average, vertical, horizontal and diagonal.

7. The method of claim 1, wherein the step of producing the second residual signal comprises quantising the second residual signal to produce a second quantised residual signal.

8. The method of claim 7, wherein the step of producing the second residual signal comprises transforming the second residual signal prior to quantising the second residual signal to produce a second transformed and quantised signal.

9. The method of claim 8, wherein the step of transforming the second residual signal comprises applying a directional decomposition transform to the second residual signal to create components that correspond to the second residual signal.

10. The method of claim 9, where the directional decomposition transform comprises the M×M kernel, which is a 4×4 kernel.

11. The method of claim 9, wherein the directional decomposition transform is a Hadamard-based transform.

12. The method of claim 9, wherein the transform produces the following components: average, vertical, horizontal and diagonal.

13. The method of claim 1, wherein one or more of the first quantised residual signal and the second residual signal is entropy encoded.

14. The method of claim 13, wherein the entropy encoding comprises one or both of run-length encoding and Huffman encoding.

15. The method of claim 1, wherein the input signal is a video signal.

16. The method of claim 15, wherein the input signal is a frame of a video signal.

17. A non-transitory computer-readable storage medium comprising instructions which when executed by a processor cause the processor to:
produce a base encoded signal by feeding an encoder with a down-sampled version of an input signal;
produce a first quantised residual signal by:
decoding the base encoded signal to produce a base decoded signal;
using a difference between the base decoded signal and the down-sampled version of the input signal to produce a first residual signal, wherein the first residual signal is subjected to a transform, and wherein the transform involves the encoder selecting between use of a 2×2 kernel and a 4×4 kernel for application against the first residual signal, such that the encoder, as a part of said selection, considers both the 2×2 kernel and the 4×4 kernel, and wherein distributions of both the first residual signal and a second residual signal have mass ranges that are within a threshold around 0, such that level 0 and level 1 enhancement streams have their masses at about a value of 0; and
quantising the first residual signal to produce the first quantised residual signal, wherein said quantising includes converting a division operation that involves a selected step-width into a multiplication operation that involves an inverse of the step-width and then applying the multiplication operation to the first residual signal;
produce the second residual signal by:
de-quantising the first quantised residual signal to produce a reconstructed version of the first residual signal;
correcting the base decoded signal using the first reconstructed version of the residual signal to create a corrected decoded version;
upsampling the corrected decoded version; and
using a difference between the corrected decoded signal and the input signal to produce the second residual signal,
wherein the second residual signal is structured to correct artifacts introduced from a use of the first residual signal, and
wherein the artifacts corrected by the second residual signal are artifacts that are generated over a spatial scale having an area that is equal to or greater than 4 pixels;
wherein the input signal when encoded comprises the base encoded signal, the first quantised signal and the second residual signal.

18. An encoder comprising a processor and memory, the processor configured to:
produce a base encoded signal by feeding an encoder with a down-sampled version of an input signal;
produce a first quantised residual signal by:
decoding the base encoded signal to produce a base decoded signal;
using a difference between the base decoded signal and the down-sampled version of the input signal to produce a first residual signal, wherein the first residual signal is subjected to a transform that involves the encoder selecting between use of a 2×2 kernel and a 4×4 kernel for application against the first residual signal, such that the encoder, as a part of said selection, considers both the 2×2 kernel and the 4×4 kernel, and wherein distributions of both the first residual signal and a second residual signal have mass ranges that are within a threshold around 0, such that level 0 and level 1 enhancement streams have their masses at about a value of 0; and
quantising the first residual signal to produce the first quantised residual signal, wherein said quantising includes converting a division operation that involves a selected step-width into a multiplication operation that involves an inverse of the step-width and then applying the multiplication operation to the first residual signal;
produce the second residual signal by:
de-quantising the first quantised residual signal to produce a reconstructed version of the first residual signal;
correcting the base decoded signal using the first reconstructed version of the residual signal to create a corrected decoded version;
upsampling the corrected decoded version; and
using a difference between the corrected decoded signal and the input signal to produce the second residual signal,
wherein the second residual signal is structured to correct artifacts introduced from a use of the first residual signal, and
wherein the artifacts corrected by the second residual signal are artifacts that are generated over a spatial scale having an area that is equal to or greater than 4 pixels;
wherein the input signal when encoded comprises the base encoded signal, the first quantised signal and the second residual signal.

* * * * *